United States Patent
Baldo et al.

(10) Patent No.: US 8,780,713 B2
(45) Date of Patent: Jul. 15, 2014

(54) LINK ADAPTATION IN WIRELESS NETWORKS

(71) Applicant: STMicroelectronics S.r.l., Agrate Brianza (IT)

(72) Inventors: Nicola Baldo, Rovigo (IT); Federico Maguolo, Mirano (IT); Simone Merlin, Solesino (IT); Andrea Zanella, Vigonza (IT); Michele Zorzi, Mestre (IT); David Siorpaes, Cortina d'Ampezzo (IT)

(73) Assignee: STMicroelectronics S.r.l., Agrate Brianza (MB) (IT)

( * ) Notice: Subject to any disclaimer, the term of this patent is extended or adjusted under 35 U.S.C. 154(b) by 0 days.

(21) Appl. No.: 13/767,807

(22) Filed: Feb. 14, 2013

(65) Prior Publication Data

US 2013/0155848 A1   Jun. 20, 2013

Related U.S. Application Data

(62) Division of application No. 12/347,874, filed on Dec. 31, 2008, now Pat. No. 8,451,726.

(51) Int. Cl.
| | |
|---|---|
| H04L 1/00 | (2006.01) |
| H04W 4/00 | (2009.01) |
| H04J 3/16 | (2006.01) |
| H04J 3/22 | (2006.01) |
| H04B 15/00 | (2006.01) |

(52) U.S. Cl.
USPC ........... 370/230; 370/332; 370/437; 370/465; 455/63.1

(58) Field of Classification Search
USPC ................. 370/229–240, 310–350, 437, 445, 370/464–465, 469; 375/133, 225–227, 254, 375/267, 299; 455/63.1, 67.13, 132–135, 455/452.2; 709/223–229
See application file for complete search history.

(56) References Cited

U.S. PATENT DOCUMENTS

| | | | |
|---|---|---|---|
| 6,904,021 | B2 | 6/2005 | Belcea |
| 6,944,460 | B2 | 9/2005 | Haartsen |
| 7,661,038 | B2 * | 2/2010 | Li et al. .................. 714/704 |
| 7,680,092 | B2 * | 3/2010 | VanLaningham et al. .... 370/342 |
| 7,805,657 | B2 | 9/2010 | Kappler et al. |
| 7,826,521 | B1 | 11/2010 | Sun et al. |
| 8,005,001 | B2 | 8/2011 | Bahk et al. |
| 8,036,168 | B2 | 10/2011 | Strutt et al. |
| 8,085,683 | B2 | 12/2011 | Leith et al. |

(Continued)

OTHER PUBLICATIONS

Nicola Baldo, Federico Maguolo, Simone Merlin, Andrea Zanella, Michele Zorzi, Diego Melpignano, David Siorpaes, "GORA: Goodput Optimal Rate Adaptation for 802.11 using Medium Status Estimation", IEEE 2008, pp. 4916-4921.

(Continued)

*Primary Examiner* — Tri H Phan
(74) *Attorney, Agent, or Firm* — Graybeal Jackson LLP

(57) ABSTRACT

An embodiment of a system for physical link adaptation in a wireless communication network such as e.g., a WLAN, selectively varies the physical mode of operation of the transmission channels serving the mobile stations in the network. The system includes an estimation module to evaluate transmission losses due to collisions as well as transmission losses due to channel errors over the transmission channel, and an adaptation module to select the physical mode of operation of the transmission channel as a function of the transmission losses due to collisions and to channel errors as evaluated by the estimation module.

22 Claims, 3 Drawing Sheets

(56) References Cited

U.S. PATENT DOCUMENTS

| | | | |
|---|---|---|---|
| 8,254,241 B2 * | 8/2012 | Branlund et al. | 370/203 |
| 8,301,081 B2 | 10/2012 | Aboba et al. | |
| 8,451,726 B2 * | 5/2013 | Baldo et al. | 370/231 |
| 2002/0187799 A1 * | 12/2002 | Haartsen | 455/509 |
| 2003/0190898 A1 | 10/2003 | Kogiantis et al. | |
| 2004/0014444 A1 * | 1/2004 | Rached et al. | 455/135 |
| 2004/0184482 A1 * | 9/2004 | Gronberg et al. | 370/477 |
| 2005/0152465 A1 | 7/2005 | Maltsev et al. | |
| 2006/0050661 A1 | 3/2006 | Shim et al. | |
| 2006/0256747 A1 | 11/2006 | Jaakkola | |
| 2006/0268976 A1 | 11/2006 | Baum et al. | |
| 2007/0054645 A1 | 3/2007 | Pan | |
| 2007/0153745 A1 * | 7/2007 | Sun et al. | 370/335 |
| 2007/0254608 A1 | 11/2007 | Bougard | |
| 2008/0095222 A1 * | 4/2008 | VanLaningham et al. | 375/227 |
| 2008/0259785 A1 * | 10/2008 | Truong et al. | 370/217 |
| 2009/0303908 A1 | 12/2009 | Deb et al. | |
| 2010/0165856 A1 | 7/2010 | Melpignano et al. | |
| 2010/0190520 A1 * | 7/2010 | Reumerman et al. | 455/522 |
| 2011/0002411 A1 | 1/2011 | Forenza et al. | |
| 2011/0032857 A1 | 2/2011 | Umeuchi et al. | |

OTHER PUBLICATIONS

Nicola Baldo, Federico Maguolo, Simone Merlin, Andrea Zanella, Michele Zorzi, Diego Melpignano, David Siorpaes, "APOS: Adaptive Parameters Optimization Scheme for Voice over IEEE 802.11g", IEEE 2008, pp. 2466-2472.

Andrea Zanella, Francesco De Pellegrini, "Statistical Characterization of the Service Time in Saturated IEEE 802.11 Networks", IEEE Communications Letters, vol. 9, No. 3, Mar. 2005, pp. 225-227.

ITU-T Recommendation G107: "The E-model, a computational model for use in transmission planning", Dec. 1998, pp. 25.

ANSI/IEEE 802.11, Information technology—Telecommunications and information exchange between systems—Local and metropolitan area networks—Specific requirements—Part 11: Wireless LAN Medium Access Control (MAC) and Physical Layer (PHY) Specifications, 1999 Edition, pp. 528.

EEE Computer Society, "Wireless LAN Medium Access Control (MAC) and Physical Layer (PHY) Specifications", 1999, pp. 70-96.

* cited by examiner

Node moving from 0m at 50s to 100m at 100s, 10 interfs, ideal SNR scheme

Node moving from 0m at 50s to 100m at 100s, 10 interfs, ARF scheme

Node moving from 0m at 50s to 100m at 100s, 10 interfs, Pcoll based SNR scheme

LINK ADAPTATION IN WIRELESS NETWORKS

PRIORITY CLAIM

The present application is a Divisional of U.S. patent application Ser. No. 12/347,874 filed Dec. 31, 2008, now U.S. Pat. No. 8,451,726, issued May 28, 2013, which application is incorporated herein by reference in its entirety.

RELATED APPLICATION DATA

This application is related to U.S. patent application Ser. No. 12/347,852 entitled CROSS-LAYER OPTIMIZATION IN MULTIMEDIA COMMUNICATIONS filed Dec. 31, 2008, which application is incorporated herein by reference in its entirety.

TECHNICAL FIELD

An embodiment of this disclosure relates to wireless communication methods. This disclosure was devised with attention paid to its possible use in multimedia communications.

BACKGROUND

Standards such as IEEE 802.11 (ANSI/IEEE Std 802.11, 1999 edition) specify the Medium Access Control (MAC) and PHYsical (PHY) layer characteristics for wireless local area networks (WLANs).

PHY specifications define a plurality of PHY modes for use in the transmission of data frames. Each PHY mode uses a particular modulation and channel coding scheme and, consequently, offers different performance in terms of transmission duration, overhead, and robustness against reception noise and interference.

In wireless methods, such as WLANs, the propagation environment changes over time and space due to factors such as mobility and interference. For that reason, no PHY mode can be regarded as optimal under all possible conditions.

In WLANs, frame-reception errors are caused by the combination of noise and interference at the receiver side. Generally, the average packet loss rate, Ploss, is determined by the modulation and coding scheme (PHY mode) adopted and by the signal-to-noise-and-interference ratio (SNIR) at the receiver side. In the absence of interfering signals, the frame error rate depends on the propagation-channel characteristics with respect to the PHY mode adopted.

In that case, the average packet error rate is denoted by Perr, and Ploss can be expressed as follows:

$$Ploss = Perr + Pcoll - Pcoll*Perr \quad (1)$$

where Pcoll accounts for the frame error probability due to collisions, i.e., signals overlapping at the receiver side. The third term in the right-hand side of (1) accounts for the fact that the two error events (channel error and collision error) are not disjoint, since packet errors can be determined by the combination of the effects of noise and interference.

Link adaptation (LA) procedures have been proposed to adjust the PHY_mode and, in turn, Ploss, to maximize the data throughput (goodput), S, given by the product of the MAC-layer data rate, MAC_Data_rate, and the frame success probability:

$$S = MAC\_Data\_rate * (1 - Ploss) \quad (2)$$

where both terms depend on the adopted PHY_mode. In fact, MAC_Data_rate generally increases (sublinearly) with the PHY rate, while Ploss generally increases at the increasing of the PHY rate, given that the SNIR remains unchanged.

Certain prior art LA procedures attempt to set the PHY mode according to the estimated channel quality, which is measured mainly through fluctuations in the Received Signal Strength Indicator (RSSI).

However, it has been noted that RSSI provided by commercial devices is often imprecise and/or inaccurate and may impair the performance of such procedures. Furthermore, in case of asymmetric radio propagation conditions, the RSSI measured by the transmitting station might not reflect the Signal to Noise Ratio (SNR) experienced by the receiving station.

Other prior art LA procedures, such as Auto Rate Fallback (ARF), exploit the fact that a failed transmission attempt can be recognized by the non-reception of an acknowledgement (ACK) frame, which is normally sent by the receiver after correct reception.

These procedures assume that all transmission failures are ascribable to adverse propagation conditions, i.e., they assume that Ploss~=Perr. Therefore, a certain number of subsequent failures is attributed to a lowering of the SNR and a more robust rate is selected. Conversely, when a certain number of subsequent successful transmissions are observed, a higher rate is selected to improve throughput.

It has been noted that a drawback of this approach lies in that, under contention-based MAC schemes and medium-to-high traffic loads, transmission failures might also be caused by MAC collisions, irrespective of the actual propagation conditions, that is to say Ploss>Perr. As a consequence, under heavy traffic conditions, these procedures are likely to unnecessarily decrease the rate even if the signal strength would be able to support a higher and better-performing modulation scheme, thus further exacerbating the medium contention problem. Indeed, rate reduction implies larger frames, with the effect that medium congestion worsens. It has thus been noted that, in that sense, ARF mechanisms are suboptimal since they do not take into account the causes of frame losses and can lead to wrong decisions when the number of contending users is appreciable, such as for example in hotspots, airports, and SOHO environments.

Further, it has been noted that another drawback of ARF-like selection procedures is given by unnecessary oscillations of the rate value, which may vary in response to the activity of other user's participating in the network. Since ARF-like procedures can not distinguish losses due to collisions and losses due to poor link quality, they are subject to modifying the rate even if the Signal-to-Noise ratio remains constant: if for example a burst transmitter is contending with a given wireless LAN client, the latter is likely to drop the rate when the first is transmitting and, vice versa, increase the rate when it is not. This effect is highly undesirable since it has harmful impact on the upper layer protocols (TCP/IP, UDP/IP) which see a time varying available bandwidth.

This effect may be especially problematic for high-bandwidth demanding multimedia applications.

For instance, FIG. 1 is an exemplary diagram representative of collision, error, and success events in a time vs. rate space for a node in a WLAN moving form 0 m at 50 s to 100 m at 100 s, by assuming 10 interferers with an ideal signal-to-noise ratio (SNR).

FIG. 1 refers to an ideal rate selection procedure in the following scenario: a mobile station is exchanging data with an 802.11g access point and moves away from it over time at constant speed, thus decreasing its SNR. The access point also serves an other ten fixed contending stations placed close to it. The Y axis shows the ideal rate selection procedure over time. In these circumstances, the rate remains fixed for given time spans and varies in response to changes in the SNR (i.e., the distance of the mobile station from the access point).

FIG. 2 is a thoroughly similar diagram representative of operation of an ARF procedure. In this case, the selected rate spans several values for the same time slots: the choice of the ARF procedure is not stable but oscillates with a rather high swing for a given signal to noise ratio.

Also, it has been noted that current Wireless LAN cards use a rate selection mechanism driven by MAC statistics, which, however, are unable to differentiate between a noisy link and a congested network. As a consequence, in the presence of congestion, these conventional WLAN card use a low PHY rate for transmission, which results in longer frames, with the result of making network congestion even worse.

Finally, it has been noted that current rate selection procedures are "blind" insofar as they adapt the modulation scheme simply based on the number of frame retransmissions, no matter what the cause of frame loss is.

SUMMARY

An embodiment of this disclosure is an arrangement for adapting the modulation and channel coding scheme used by a mobile station (e.g., in a IEEE 802.11 WLAN), with the capability of determining the collision probability and channel error rate of frame transmissions.

Another embodiment of this disclosure provides an optimal rate-selection procedure for use in that context.

An embodiment of the disclosure also relates to a corresponding method, a related network as well as a related computer program product, loadable in the memory of at least one computer and including software code portions for performing the steps of a method of an embodiment of the disclosure when the product is run on a computer. As used herein, reference to such a computer program product is intended to be equivalent to reference to a computer-readable medium containing instructions for controlling a computer method to coordinate the performance of a method. Reference to "at least one computer" is intended to highlight the possibility for an embodiment of the present disclosure to be implemented in a distributed/modular fashion.

An embodiment of the arrangement described herein is based on the recognition that existing rate-selection procedures are not optimal since they do not distinguish between losses due to collision probability (Pcoll) and losses due to channel errors (Perr) inferred by low Signal to Noise Ratio (SNR) values.

In an embodiment, a mobile station (STA) collects MAC-layer statistics including the number of successful and unsuccessful transmission/reception events, channel busy periods, idle slots. These statistics are then processed to estimate the collision probability and the channel error rate that might affect future transmission attempts by the STA. Such estimate is then used to select the PHY mode that maximizes the throughput of the station, that is the product of the average MAC-layer data rate expected with the chosen PHY and the probability that the transmitted packet will be successfully received.

In an embodiment, a rate selection method is proposed that selects the PHY rate in the MAC based on estimates of packet-error and packet-collision probabilities. This method is compliant with the current standards and can be realized with modification in the MAC firmware.

In an embodiment, the proposed MAC is able to distinguish between noise and congestion in the wireless LAN, with the possibility of propagating that information to higher layers in the protocol stack so that suitable data protection mechanisms can be applied to the traffic being generated.

In an embodiment, a link adaptation procedure is provided to adjust the PHY mode of wireless terminals according to the method state, expressed in terms of Pcoll and SNR values. In contrast to existing methods, RSSI is not used to estimate the channel conditions, so that all the calibration and unreliability problems concerning with the RSSI circuitry are avoided.

In an embodiment, the estimation of Perr and Pcoll is performed using MAC statistics defined by the 802.11 standard, together with information regarding the number of idle timeslots experienced by the device and the statistics of the channel busy periods, which are not included in MAC statistics defined by the 802.11 standard but can be easily implemented by card manufacturers.

In an embodiment, these statistics are processed using a pre-determined formula to determine Pcoll. Subsequently, Perr is determined by comparison between Pcoll and the total number of previously failed frame transmission attempts. Once Perr is known, knowledge of the Packet Error Rate performance of each PHY mode with respect to the Signal-to-Noise Ratio (SNR) is exploited to determine the SNR currently being experienced by the receiver. With this information, the possibility exists of determining, for each PHY mode, the Perr that would be experienced in the same conditions by using that PHY mode.

In an embodiment, a link adaptation procedure selects the PHY mode which yields the lowest average transmission time while providing a Perr which is below a pre-determined threshold (which corresponds to maximizing the data throughput). In an embodiment, the PHY rate is modified based on the source of packet loss, namely different approaches are chosen if the frame is lost because of noise in the link or because of congestion in the network. In an embodiment, an estimation procedure is provided in a MAC processor that can distinguish when packet losses occur because of congestion or because of low Signal-to-Noise ratio, whereby an optimal PHY-layer modulation scheme can be selected.

BRIEF DESCRIPTION OF THE DRAWINGS

One or more embodiments will now be described, by way of example, with reference to the enclosed views, wherein.

DETAILED DESCRIPTION

In the following description, numerous specific details are given to provide a thorough understanding of embodiments. The embodiments may be practiced without one or more of the specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience and do not interpret the scope or meaning of the embodiments.

Figure 3:
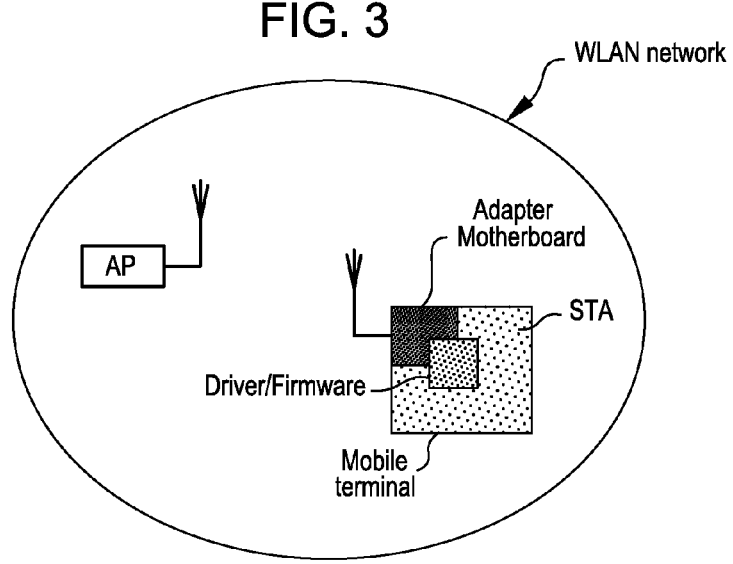
FIG. 3 is exemplary of a possible scenario of use of an embodiment of the arrangement described herein.

FIG. 3 illustrates an embodiment of a WLAN method architecture related to an arrangement described herein. In particular, this scenario includes mobile terminal STA configured for communication via an access point (AP). While not expressly illustrated, other active STAB in the WLAN—associated with the same access point (AP)—may affect the conditions of communication between the mobile station STA and the access point AP.

In the following, the mobile terminal STA will be assumed to include a driver/firmware module (or alternatively a hardware module) adapted to support the processing tasks detailed in the following.

In the exemplary context of a wireless LAN method, the arrangement described herein may be implemented in the mobile station STA and the related processing functions may reside either in the firmware of the card adapter or in its driver. In the first case the software runs in the WLAN chipset itself, whereas in the second case the solution runs in the operating method (e.g.,: Windows, Symbian, Linux). This result may be achieved by means of an adapted motherboard mounted in the mobile terminal STA.

Figure 4:
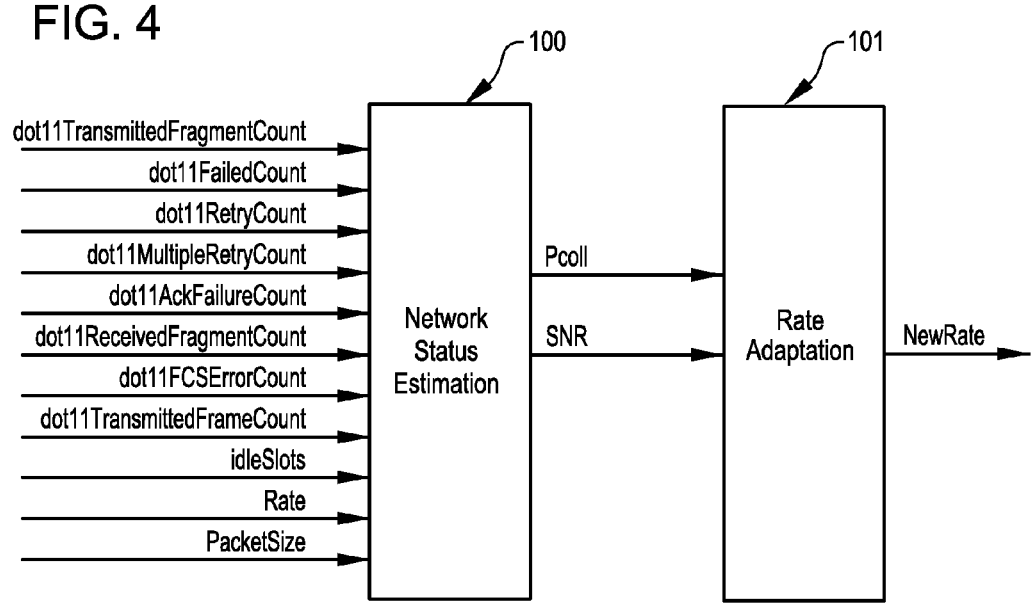
FIG. 4 is a block diagram exemplary of certain processing functions in an embodiment of the arrangement described herein.

Referring to FIG. 4, in an embodiment, the processing functions underlying an arrangement described herein may be seen as partitioned in two blocks or modules, namely a network-status-estimation (NSE) module 100 and a rate-adaptation (RA) block or module 101.

The NSE block 100 provides two output variables, SNR and Pcoll.

The values of these variables may be updated at periodic intervals.

The NSE module receives as input the following counters:
dot11TransmittedFragmentCount
dot11FailedCount
dot11RetryCount
dot11MultipleRetryCount
dot11ACKFailureCount
dot11ReceivedFragmentCount
dot11FCSErrorCount
dot11TransmittedFrameCount These MAC counters (and, more to the point, how these may be obtained in a WLAN mobile station) are detailed e.g., in Annex D of the IEEE 802.11, which is incorporated by reference and already cited, which makes it unnecessary to provide a detailed description herein.

These counters are differentially processed by the NSE module 100, so that the value used by the NSE module 100 for each counter represents how much the original counter incremented in the last period.

As further input, the NSE module 100 receives the following variables:
idleSlots, which represents the number of MAC timeslots for which CCA operation indicated a clear channel in the last period;
PacketSize, which represents the packet size which was used for last period;
Rate, which represents the PHY rate which was used for last period.

Again MAC timeslots and CCA operation as defined in the foregoing are detailed e.g., in Annex D of the IEEE 802.11, repeatedly cited, which makes it unnecessary to provide a detailed description herein.

The following internal variables are defined:

TotFrames=dot11TransmittedFragmentCount+ dot11ACKFailureCount

Ploss=dot11ACKFailureCount/TotFrames

The output variable Pcoll is calculated as:

Pcoll=(dot11FCSErrorCount+ dot11ReceivedFragmentCount)/ (dot11FCSErrorCount+ dot11ReceivedFragmentCount+idleSlots)

with the exception that if Pcoll is greater than Ploss, Pcoll is set to Ploss.

The NSE module 100 is aware of the Packet Error Rate (PER) performance due to noise of the PHY rates used by the device, for different packet sizes. This is expressed by the following function:

function_per(SNR,$z,r$)

where SNR is the Signal to Noise Ratio, z is the packet size (PacketSize) and r is the PHY rate (Rate).

This function is pre-determined on a per-device basis; also it is expected to be monotonic in s, and may therefore, be inverted with respect to the signal-to-noise ratio to obtain the following function:

function_snr($s,z,r$)

where s is the packet error rate due to noise only (Perr).

The NSE module 100 calculates the value of the internal variable Perr as follows:

Perr=(dot11FCSErrorCount−TotFrames*Pcoll)/(Tot-Frames*(1−Pcoll))

and finally the value of the output variable SNR is determined as

SNR=function_snr(Perr,PacketSize,Rate)

The values for Pcoll and SNR are fed to the RA module 101 to calculate the output variable NewRate at periodic intervals. This variable represents the new PHY rate to be used for data transmission. NewRate is the PHY rate that maximizes the expected throughput (average number of successfully delivered bits per unit of time) for the given values of Pcoll and SNR. The throughput estimation is given by the following mathematical model $G$=PacketSize(1−Plosse^rmax)/$my$ where
rmax is the MAC parameter (OptRetryLimit) that gives the maximum number of unsuccessful transmission attempts for a MAC protocol data unit (MPDU) before being dropped by the MAC layer
Plosse is the estimated loss rate, given by Plosse=Pcoll+(1−Pcoll)Perre where Perre=function_per(SNR,PacketSize,$r$)

is the expected probability error rate with signal-to-noise ratio equal to SNR, packet size equal to PacketSize, and PHY modulation rate r.

The term my is the expected mean service time for the MPDU, which is the statistical expectation of the time taken by the MAC entity to process a MPDU, from the time it reaches the head of the MAC queue until the time it gets acknowledged by the peer entity or dropped because it was unsuccessfully retransmitted for rmax times. The mean service time is given by $$my = mb + mT;$$

where
mb is the expected backoff time and mT is the expected transmission time. The expected backoff time is obtained as follows $$mb = \\ mtick * \text{sum}\_\{i = 1\}^\wedge\{rmax\}Plosse^\wedge(i-1)*(1-Plosse)*\text{sum}\_\{j=1\}^\wedge \\ i(CW(j)-1)/2 + Plosse^\wedge rmax * \text{sum}\_\{k=1\}^\wedge rmax(CW(k)-1)/2$$

where CW(j) is the size of the backoff window at the j-th transmission attempts of the same MPDU that, according to the specifications, is given equal to $$CW(j) = CW0 * 2^\wedge \min(j, m0)$$

where CW0 is the minimum backoff window size (defined by the standard), whereas m0 determines the maximal backoff window size (equal to Cw0*2^m0), still defined by the standard.

mtick is the mean time between two successive decrements of the backoff counter of a backlogged station. The value of mtick might be directly estimated by the MAC layer (though this feature is usually not supported by commercial cards). The parameter may also be determined as follows $$m\text{tick} = T\text{slot}*P\text{idle} + T\text{busy}*(1-P\text{idle})$$

where Tslot is the standard slot duration, Tbusy is the average duration of the busy periods, as measured by the MAC layer, and Pidle is the fraction of idle ticks over the total number of ticks observed by the MAC layer in a given observation period.

The RA module is also aware of the function function_per (s,z,r) which was defined above in the description of the NSE module 100. This function may be written into the firmware by the card manufacturer and accessed by the RA through a suitable cross-layer plane whose definition is outside of the scope of this disclosure.

The output variable NewRate is set to the PHY rate that, among all PHY rates R which can be used by the device (i.e. the STA), yields the lower value of the internal variable ExpectedPerr, which is defined as $$\text{Expected}Perr = \text{function\_per}(SNR, PacketSize, R)$$

In an embodiment, an enhanced version of the Auto Rate Fallback (ARF) procedure (previously discussed) may be used.

In fact, the standard ARF procedure used as input variables the counters dot11TransmittedFragmentCount and dot11ACKFailureCount.

In an embodiment herein, the counter FilteredACKFailureCount is used as an input in the place of the counter dot11ACKFailureCount.

The counter FilteredACKFailureCount is determined as:

$$\text{FilteredACKFailureCount} = \text{dot11ACKFailureCount} * Perr/(Pcoll + Perr)$$

In an embodiment, the counter FilteredACKFailureCount is not determined in a deterministic manner by scaling dot11ACKFailureCount. Conversely, each time dot11ACKFailureCount is incremented, a random value X in [0,1] is drawn by means of a random number generator.

If $X \leq (Perr/(Pcoll+Perr))$, the FilteredACKFailureCount counter is incremented, otherwise it is not.

In an embodiment (e.g., when the idleSlot input variable is not available) the same input variable may be estimated as $$\text{idleSlots} = (T - (\text{dot11FCSErrorCount} + \\ \text{dot11ReceivedFragmentCount} + TotFrames)*Tc)/ \\ \text{sigma}$$

where T is the duration of the period the counters refer to, Tc is the average duration of a packet transmission, and sigma is the duration of a timeslot (again as defined in the IEEE 802.11 standard, all versions of which are incorporated by reference).

Figure 1:
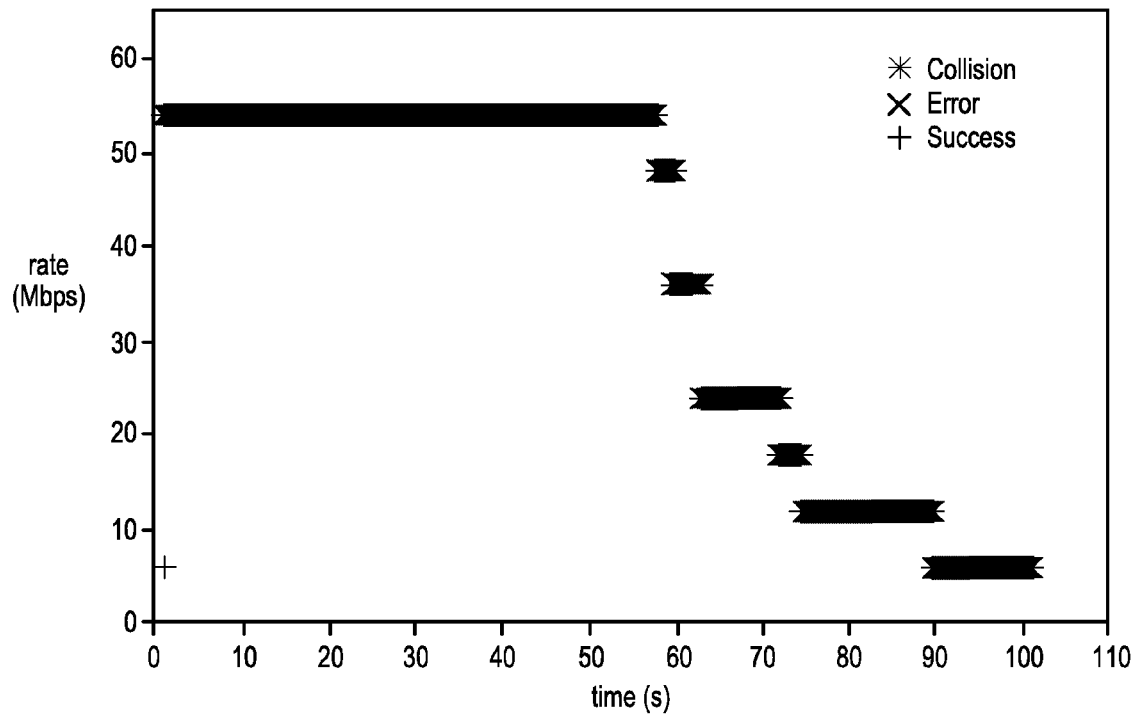
FIGS. 1 and 2 have been discussed in the foregoing.
Figure 2:
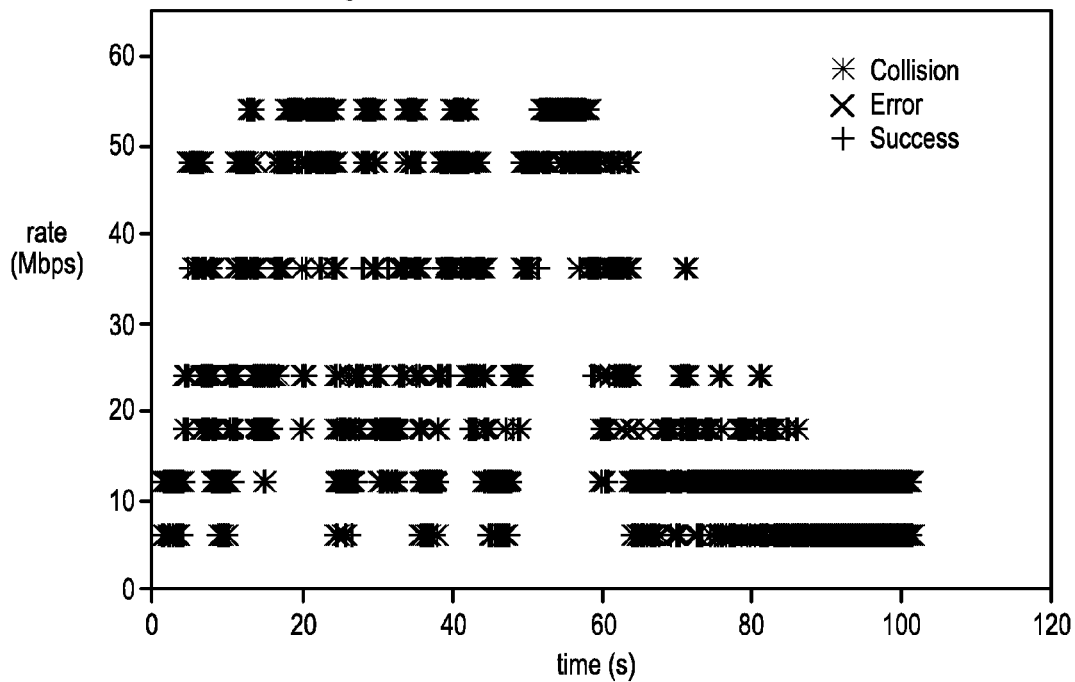
Figure 5:
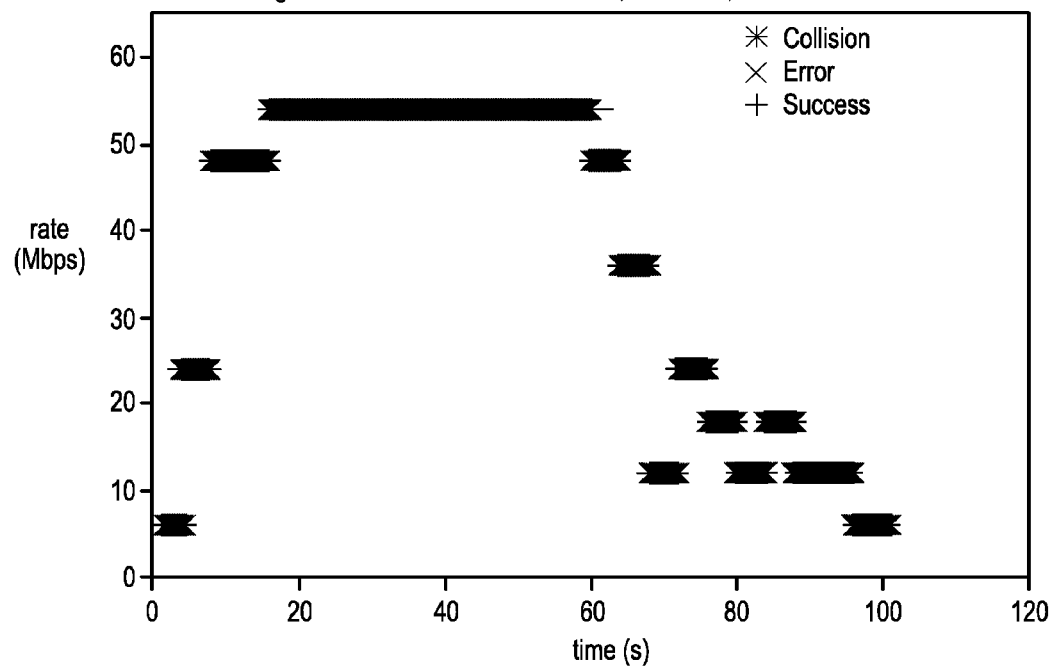
FIG. 5 is a diagram to compare operation of an embodiment of the arrangement described herein against the diagrams of FIGS. 1 and 2.

The diagram of FIG. 5 illustrates by way of direct comparison to FIGS. 1 and 2 (under the same conditions) rate selection as performed in the arrangement described herein. The stability of an embodiment of the proposed solution may be easily appreciated over the conventional arrangements of FIGS. 1 and 2.

Figure 6:
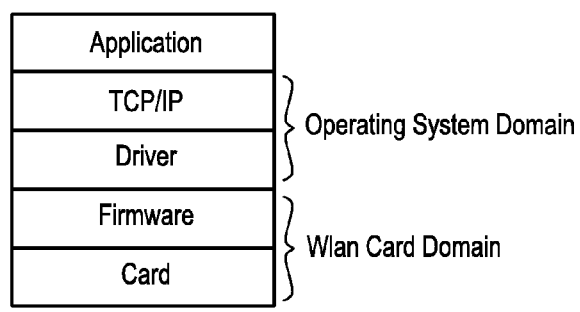
FIG. 6 is exemplary of an embodiment of a stack arrangement.

FIG. 6 shows an embodiment of a network protocol stack of a software method adapted to implement an embodiment of the arrangement described herein. There, the WLAN card domain components (firmware, card) are shown with the operating method domain components (TCP/IP and driver) superimposed thereon. The application component tops the stack.

Depending on integration convenience, an embodiment of the arrangement described herein may be developed in the domain of the wireless LAN card (firmware) or in the domain of the operation method (driver), without distinction.

As the solution is fully implemented in software, there may be no need of modifying existing hardware. Also, since the 802.11 standard does not dictate the rate selection procedure, embodiments of the arrangement described herein fully adhere to legacy 802.11 methods.

Differences of an embodiment of the arrangement described herein over conventional solutions include:
 the embodiment does not make use of the RSSI, which can be imprecise and inaccurate in real devices;
 the embodiment uses 802.11 MAC counters to estimate the congestion level of the WLAN;
 the embodiment permits selecting the PHY rate taking into account not only the signal-to-noise ratio but also the MAC collision probability.

The possible use of an embodiment of the arrangement described herein in a 802.11 device may be detected by changing the values of the 802.11 MAC counters and observing the PHY rate changes taking place according to one of the procedure embodiments described in the foregoing.

Without prejudice to the underlying principles of the disclosure, the details and the embodiments may vary, even appreciably, with respect to what has been described by way of example, without departing from the scope of the disclosure.

Naturally, in order to satisfy local and specific requirements, a person skilled in the art may apply to the solution described above many modifications and alterations. Particularly, although the present disclosure has been described with a certain degree of particularity with reference to described embodiment(s) thereof, it should be understood that various omissions, substitutions and changes in the form and details as well as other embodiments are possible. Moreover, it is expressly intended that specific elements and/or method steps described in connection with any disclosed embodiment of the disclosure may be incorporated in any other embodiment as a general matter of design choice.

What is claimed is:

1. A method, comprising:
   determining a collision-failure probability that a first unit will not receive first data transmitted over a wireless channel due to an overlapping transmission of second data over the channel;
   determining a channel-failure probability that the first unit will not receive the first data due to a characteristic of the channel; and
   selecting in response to the collision- and channel-failure probabilities a value for a data-transmission parameter for transmitting data to the first unit.

2. The method of claim 1 wherein determining the collision-failure probability comprises determining the collision-failure probability that the first unit will not receive the first data transmitted by a second unit due to an overlapping transmission of the second data by a third unit.

3. The method of claim 1 wherein determining the collision-failure probability comprises determining the collision-failure probability from a value generated by a medium-access-control counter.

4. The method of claim 1 wherein determining the collision-failure probability comprises determining the collision-failure probability from a change in a value generated by a medium-access-control counter.

5. The method of claim 1 wherein determining the channel-failure probability comprises determining the channel-failure probability from the collision-failure probability.

6. The method of claim 1 wherein determining the channel-failure probability comprises determining the channel-failure probability from a number of data transmissions to the first unit that are not acknowledged by the first unit as being received.

7. The method of claim 1, further comprising:
   determining a signal-to-noise ratio of the channel from the channel-failure probability; and
   selecting the value of the data-transmission parameter in response to the collision-failure probability and the signal-to-noise ratio.

8. The method of claim 1 wherein the characteristic of the channel comprises noise.

9. The method of claim 1 wherein selecting the value of the data-transmission parameter comprises selecting the value of the data-transmission parameter from a look-up table.

10. The method of claim 1 wherein selecting the value of the data-transmission parameter comprises calculating the value of the data-transmission parameter.

11. The method of claim 1 wherein the data-transmission parameter comprises a rate at which data is transmitted to the first unit.

12. The method of claim 1 wherein selecting the value of the data-transmission parameter comprises:
    calculating respective data-transmission throughputs from the collision- and channel-failure probabilities over a range of values of the data-transmission parameter; and
    selecting as the value of the data-transmission parameter the value corresponding to the highest calculated data-transmission throughput.

13. The method of claim 1 wherein selecting the value of the data-transmission parameter comprises:
    calculating respective data-transmission throughputs from the collision- and channel-failure probabilities over a range of values of the data-transmission parameter;
    selecting as the value of the data-transmission parameter the value corresponding to the highest calculated data-transmission throughput.

14. The method of claim 1 wherein selecting the value of the first data-transmission parameter comprises:
    calculating respective estimated channel-failure probabilities from the collision- and channel-failure probabilities over a range of values of the first data-transmission parameter; and
    selecting as the value of the data-transmission parameter the value corresponding to the lowest channel-failure probability.

15. The method of claim 1, further comprising:
    determining a value from the collision-and channel-failure probabilities and a number of data transmissions to the first unit that are not acknowledged by the first unit as being received; and
    updating the channel-failure probability using the value.

16. The method of claim 1, further comprising:
    determining a value from the collision-and channel-failure probabilities and from a number of data transmissions to the first unit that are not acknowledged by the first unit as being received;
    generating a substantially random number;
    incrementing the value only if another data transmission to the first unit is not acknowledged by the first unit as being received and if the random number has a predetermined relationship to a predetermined mathematical combination of the collision- and channel-failure probabilities; and
    updating the channel-failure probability using the value.

17. A communication unit, comprising:
    a transmitter;
    a first module operable
       to determine a collision-failure probability that a remote unit will not receive first data transmitted from the transmitter over a wireless channel due to an overlapping transmission of second data over the channel, and
       to determine a channel-failure probability that the remote unit will not receive the first data due to a characteristic of the channel; and
    a second module operable to select in response to the collision- and channel-failure probabilities a value for a data-transmission parameter according to which the transmitter transmits data to the remote unit.

18. The communication unit of claim 17 wherein at least one of the first and second modules comprises a respective software component.

19. The communication unit of claim 17 wherein at least one of the first and second modules comprises a respective hardware component.

20. The communication unit of claim 7, further comprising a receiver operable to receive data transmitted by the remote unit.

21. The communication unit of claim 7, further comprising:
    a memory operable to store values of the data-transmission parameter corresponding to respective pairs of values of the collision- and channel-failure probabilities; and
    wherein the second module is operable to select the value of the data-transmission parameter from a storage location of the memory that corresponds to the determined values of the collision- and channel-failure probabilities.

22. A non-transitory computer-readable medium storing program instructions that when executed by a processor, cause the processor:

to determine a collision-failure probability that a first unit will not receive first data transmitted over a wireless channel due to an overlapping transmission of second data over the channel;

to determine a channel-failure probability that the first unit will not receive the first data due to a characteristic of the channel; and to select in response to the collision- and channel-failure probabilities a value for a data-transmission parameter for transmitting data to the first unit.

* * * * *